United States Patent [19]

Pizzorno

[11] Patent Number: 4,860,620
[45] Date of Patent: Aug. 29, 1989

[54] DEVICE APT FOR CUTTING OR FOR TRIMMING THE EDGES OF RUBBERIZED FABRICS

[75] Inventor: Augusto Pizzorno, Milan, Italy

[73] Assignee: Pirelli Coordinamento Pneumatici S.p.A., Milan, Italy

[21] Appl. No.: 124,967

[22] Filed: Nov. 24, 1987

[30] Foreign Application Priority Data

Nov. 28, 1986 [IT] Italy ............................ 22496 A/86

[51] Int. Cl.$^4$ .......................................... B27B 13/00
[52] U.S. Cl. ........................................ 83/156; 83/433
[58] Field of Search ............... 83/156, 500, 504, 914, 83/433

[56] References Cited

U.S. PATENT DOCUMENTS

| | | | |
|---|---|---|---|
| 3,692,022 | 9/1972 | Ewing | 128/87 A |
| 3,909,341 | 9/1975 | Moscovita | 156/502 |
| 3,962,022 | 6/1976 | Bottasso et al. | 156/507 |
| 4,054,475 | 10/1977 | Bottasso et al. | 156/157 |
| 4,058,475 | 11/1977 | Jinnai et al. | 252/299 |
| 4,106,379 | 8/1978 | Spengler | 83/914 X |
| 4,231,836 | 11/1980 | Ljungqvist et al. | 156/421 |
| 4,317,398 | 3/1982 | Jones et al. | 83/156 |
| 4,404,836 | 9/1983 | Saunders | 83/914 X |
| 4,478,672 | 10/1984 | Precht | 156/421 |
| 4,506,577 | 3/1985 | Shinomiya et al. | 83/500 X |
| 4,633,745 | 1/1987 | Asano | 83/914 X |

Primary Examiner—William L. Sikes
Assistant Examiner—Akm E. Ullah
Attorney, Agent, or Firm—Birch, Stewart, Kolasch & Birch

[57] ABSTRACT

A device for trimming the edges of rubberized fabrics, provided with transversal reinforcing elements, which consists of at least one pair of shears (80 or 82) having opposing blades (88, 92 or 90, 94), which can be positioned with precision by means of a device that comprises at least one screw shaft (40 or 42) engaged inside a sleeve (52 or 54) having a threaded inner cavity that holds a casing (76 or 78) that bears the above shears (80 or 82). The device finds particular application when preparing carcass plies for tires.

10 Claims, 3 Drawing Sheets

DEVICE APT FOR CUTTING OR FOR TRIMMING THE EDGES OF RUBBERIZED FABRICS

BACKGROUND OF THE INVENTION

1. Field of the Invention

The present invention relates to a device that is useful for cutting rubberized fabrics, in particular rubber sheets of the type provided with reinforcing elements, the cut being in correspondence with one of the reinforcing elements, for the purpose of aiding the butt-end joining between the fabrics.

2. Prior Art

Continuous rubberized fabric tapes are already known that are provided with transversal metallic cords that are used, for example, in manufacturing carcasses for so-called radial tires. The continuous tapes are obtained by joining together rectangular lengths of said rubberized fabric, along the edges parallel to the direction of the metallic cords forming the reinforcing elements.

Two types of joining of rubberized fabrics are already known. The joining by overlapping, i.e. the superimpositioning of the sheet edges to be joined, and the butt-end joining simply by drawing closer and by butt-end joining the edges of the sheets to be joined.

The type of joining that is preferably chosen for the rubberized fabric, reinforced with metallic cords, is the butt-end joining method because, owing to the dimension of the metallic reinforcing cords, any joining by overlapping could present an intollerable thickening with the consequence of localized discontinuities characteristic of the so-formed continuous fabric tape.

From the prior techniques, apparatuses are already known that are capable of making provision for the butt-end joining. A first apparatus, that was described in U.S. Pat. No. 3,692,022 and U.S. Pat. No. 4,058,475, in the name of the same Applicant as for this patent application, discloses the butt-end joining, along the edges which are parallel to the metallic reinforcing cords of unvulcanized rubberized fabric lengths by means of clenching two edges of adjacent lengths in-between two flat comb-shaped jaws which draw together and penetrate in such a way as to completely join the edges, with local heating the edges of the fabric lengths for fostering the phenomena of adhesion and diffusion of the rubber compound in-between the two respective lengths. This system is very efficacious since the butt-end joining between the two lengths results in being decidedly reliable; however, it has the drawback of producing a thickening of the reinforcing cords adjacent to the two joined edges that could cause variations in the physical properties of the tape in correspondence with the joints that can not always be tolerated in the products obtained from such a tape.

A second apparatus, that obviates the above thickening phenomena in the reinforcing cords, is the one described in U.S. patent application No. 058231 filed June 4, 1987, also in the name of the same Applicant as for this patent application, which provides for the butt-end joining of two lengths of rubberized fabric still along the two edges parallel to the metallic reinforcing cords, by means of forcedly joining the edges in a progressive way through the action of two pairs of frusto-conical rollers that lie with one of ther generatrices against the lengths, for having the clenching between them, and by moving the rollers along the edges. In this way the butt-end joining is produced without any thickening of the reinforcing cords and so as to obviate the type of variations described above in the physical properties of the tape. However, success is not always to be had in obviating dis-uniformities in the rubber of the joining zone, due:

(a) to an excess of rubber material in-between the reinforcing cords immediately adjacent to the edges, that causes the formation of a bulge, or a weld, in correspondence of the joining; and (b) to breaks in the continuity, or burrs in the cut-off rubber edges that cause a thinning-out, or even, spaces left open in the joined zone.

In the worst case, the disuniformity could include both of the defects mentioned above i.e. localized bulges alternated with thinnings, or gaps, in the joined zone.

SUMMARY OF THE INVENTION

It has been found that for obviating such serious drawbacks as discussed above, above-all the burred edges, it is necessary to reduce, to a minimum, the width of the rubber zone which, after a cut is made in the length of the rubberized fabric, is found between the edge of the length itself and the first, immediately adjacent metallic cord.

In particular, it is necessary to cut, or to trim the edge of one length of rubberized fabric, by cutting the rubber along the edge of the metallic cord and, for greater preference, in case the reinforcing element should be formed of a metallic cord made of a bunch of long-pitch twisted wires bound together by a wrapper that is wound, in the contrary sense, around the same cord, according to a substantially shorter pitch, the cutting, or trimming of the rubber must be done in such as way as to only expose a part of the wrapper wound around the cord, leaving completely clad the wires which constitute the cord.

In fact, by cutting the rubber as close as possible and parallel to the reinforcing element or cords, and seeing that the rubber is stressed in a very narrow zone comprised between the blades that provide for the cutting and a reinforcing element that, in this case, is a metallic cord, the best conditions are found for producing a clean cut, and a sufficient quantity of rubber can always be had for realizing a joint without having any thickening of the reinforcing elements and without producing bulges or welds in the joints, which would result from an excess of rubber material, nor gaps either in the joining due to burrs on the edges, particularly when the apparatus that is described in the U.S. patent application Ser. No. 058231, is utilized.

The device, according to the invention, for realizing the cutting or trimming of the edges of rubberized fabric having transversal reinforcing elements made of metallic cords along the edge of the reinforcing elements consists of at least one pair of shears, which have opposed blades, that are positioned with precision, in such a manner that the shears cut the rubberized fabric exactly along the edge of one of the reinforcing elements, just as required.

The device for trimming the edges of rubberized fabrics, provided with transversal reinforcing elements, consists of at least one pair of shears (80 or 82) having opposing blades (88, 92 or 90, 94), which can be positioned with precision by means of a device that comprises at least one screw shaft (40 or 42) engaged inside a sleeve (52 or 54) having a threaded inner cavity that holds a casing (76 or 78) that bears the above shears (80 or 82). The device finds particular application when preparing carcass plies for tires.

For preference, the shears are rotating blades that consist of at least one pair of sharp-edged conical discs, opposed in such a way that their edges are superimposed or interfere reciprocally, on a tract corresponding substantially with the thickness of the rubberized fabric to be cut. These two discs are put into rotation, in the contrary sense, at a peripheral velocity that is substantially equal.

For greater preference, the opposed conical discs each have their greater side engaged in interference with the corresponding side of the next disc, and their lesser side opposed to the greater side, in such a way that the two greater sides correspond with the inner sides or the shear-blades of the pair while the lesser sides correspond with the outer sides.

For still greater preference, the greater sides of the pairs of discs, that constitute the shears for cutting or for trimming the edge of the rubberized fabric, present an angle of between 3°-10° with respect to the advancing direction of the rubberized fabric. For greater preference, the above angle should be about 5°.

Still preferably, the rotating-blade shears are positioned precisely with respect to an edge to be trimmed of the rubberized fabric by means of a positioning device which consists of a screw shaft that is engaged inside a cylindrical sleeve having a hollow threaded inner cavity, which drags a frame that bears an actioning motor and the discs of the shears.

For further preference, with the purpose of compensating irregularities in the positioning, with respect to the shears of the reinforcing elements present in the rubberized fabric, the cylindrical sleeve, engaged with the screw-shaft, entrains two parallel sides of an articulated parallelogram that, on one side, has a slipping sleeve inserted on a fixed guide parallel to the screw-shaft and, on the other side, has a frame bearing the motor and the shears, in such a way that the shears can be shifted over the rubberized fabric for finding the best point for making the cut.

For even greater preference, the frame bearing the motor and the discs of the shears is also provided with means for guiding and means for detecting the presence of a burr, or a piece of the edge that has detached from the rubberized fabric.

In a particularly preferred embodiment of this invention, the cutting and trimming unit is doubled, by consisting of two shears and their rotating discs, each disposed at the edge of the rubberized fabric, having the above-mentioned positioning characteristics, as well as accessories.

BRIEF DESCRIPTION OF DRAWINGS

The characteristics and merits of the present invention will appear even more evident from the following detailed description given herein by way of non-limiting example, as seen in the attached drawing sheets, whereby.

DETAILED DISCUSSION

Figures 1, 2:
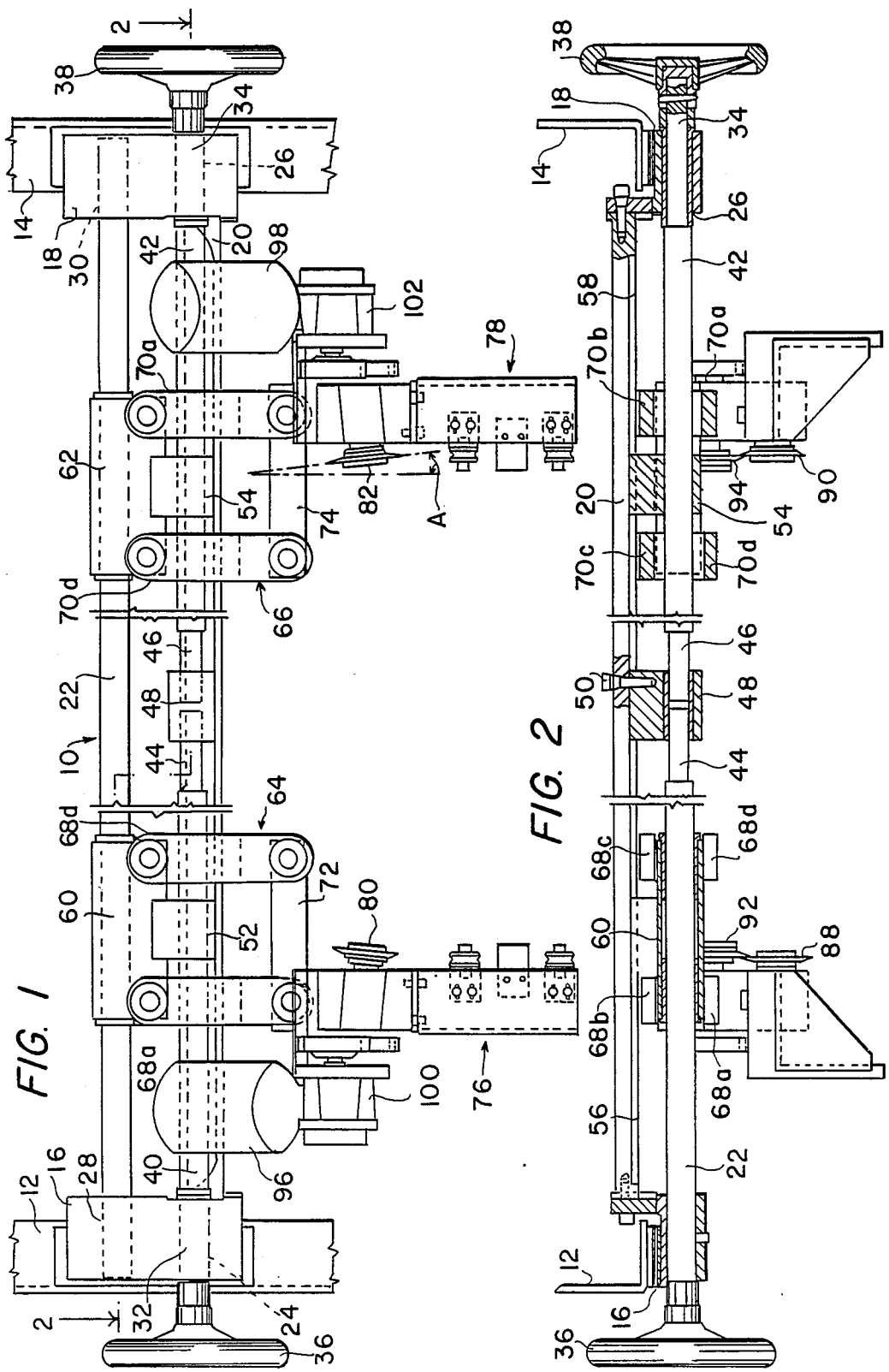
FIG. 1—is a frontal view of a trimming device with two shears, according to the present invention.
FIG. 2—is a partially cutaway, top-view of the same trimming device, taken along the line 2—2 of FIG. 1.

Considering FIGS. 1 to 4, the device of the invention consists of a rigid supporting frame (10) formed by two upright rods (12 and 14) bearing two supports (16 and 18), fixed by known means, such as bolts, for example, and being connected to one another through a rigid grooved transom (20) and through a cylindrical guide (22). The two supports (16 and 18), are provided with first through-holes (24 and 26 respectively), and second through-holes (28 and 30 respectively). The holes (24 and 26 respectively) house two rotating shafts (32 and 34) provided, at their respective external ends, with control wheels (36 and 38). The holes (28 and 30 respectively), house the cylindrical guide (22). The two rotating shafts (32 and 34), are respectively provided with threaded parts (40 and 42) and they terminate at their respective inner extremities in two smooth parts (44 and 46) having a reduced diameter, engaged in a cylindrical cavity of a support (48) that is fixed in cantilever fashion, by such means as screws (50), of which only one is shown, to the rigid transom (20). The threaded parts (40 and 42), of the rotating shafts (32 and 34), engage respectively in the threaded cavities of the cylindrical sleeves (52 and 54) provided with slides that engage in one of the grooves (56 and 58) of the rigid transom (20), and they are fixed respectively to a lower expansion of the sleeves (60 and 62) that are smooth internally, and made slidable on guide (22).

Seeing that the shears, which cut the rubberized fabric, have to search spontaneously for a soft point in the rubberized fabric, while not making any cut right inside any reinforcing element, sleeves (60 and 62) form the upper sides of two articulated parallelograms (respectively 64 and 66), each one having moreover, two pairs of lateral sides (respectively 68a, 68b, 68c, 68d and 70a, 70b, 70c, 70d) and a lower side (72 and 74), respectively. The lower sides (72 and 74) are the horizontal arms of two respective frames (76 and 78), bearing the respective shears ane rotating discs (80 and 82) that provide for trimming a sheet (84) of rubberized fabric that contains the longitudinal reinforcing elements (86) such as the metallic cords (see FIGS. 3 and 4).

Each of the shears (80 and 82) is formed by a first disc, or front disc (88 and 90 respectively) and a second or rear disc (92 and 94 respectively). The discs of the two shears (80 and 82) are put into synchronous rotation by means of electric motors (96 and 98 respectively), through the engaging and synchronizing groups (100 and 102 respectively), wihch ensure the discs (88, 92 and 90, 94) forming the respective shears (80 and 82), have the same rotation velocity, in such a way as to allow for the rubberized fabric a separation that is devoid of lateral stresses tending to alter the distance between the reinforcing elements (86) and to cause the unchecked tearing of the rubber disposed between the reinforcing elements.

Figure 3:
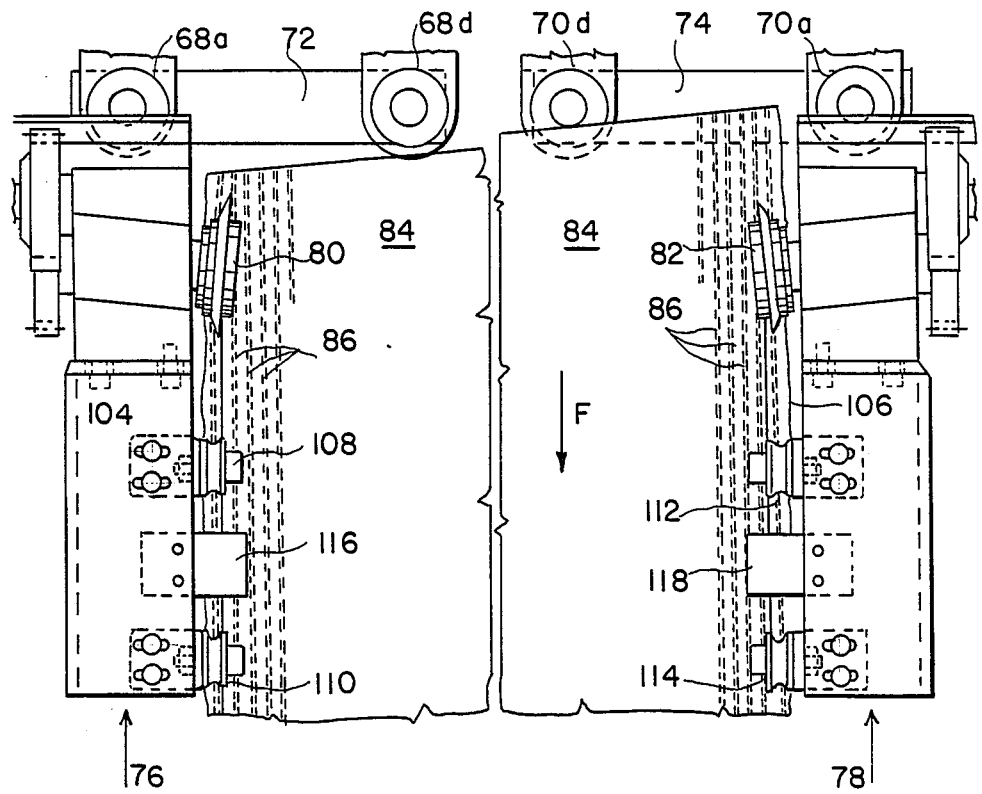
FIG. 3—is an enlarged view of parts of FIG. 1, which show details of the trimming operation of a sheet of rubberized fabric.
Figure 4:
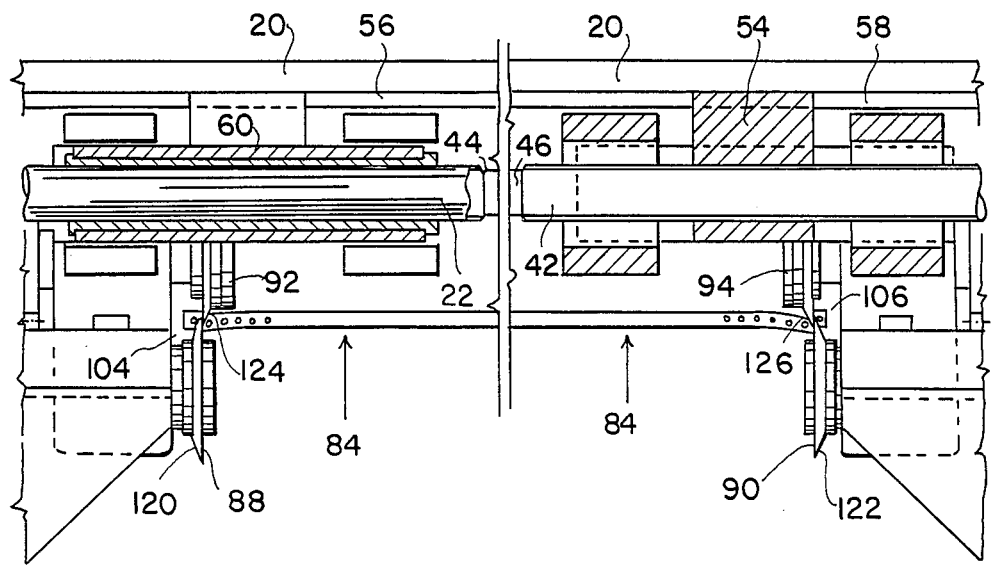
FIG. 4—is an enlarged view of parts of FIG. 2, which shows details of the same trimming operation of a sheet of rubberized fabric.

Upon considering, in particular, the enlarged views of FIGS. 3 and 4, it can be understood how the trimming of the sheet (84) takes place with a cut along one of its reinforcing elements (86).

The rubberized fabric sheet (84) that must be trimmmed on both sides that are parallel to the reinforcing elements 86 is inserted in-between the two shears (80 and 82) and it is moved in the direction F (see FIG. 3), while undergoing the detachment of its outer trimmed-edge scrap (104 and 106), due to the work of the shears (80 and 82), and with each of the outer trimmed-edge scrap containing at least one reinforcing element (86), in such a way as to produce the narrow strip or tape of rubberized fabric that has to be removed from the sheet (84).

The removal of the trimmed-edge scrap (104 and 106) from the sheet (84) is obtained through using two different series of provisions:

(a) the two shears (80 and 82) have the planes of their discs inclined outwardly with respect to the directions of the reinforcing elements (86), in such a way that advancement of the sheet (84) causes the removal of the trimmed-edge scrap (104 and 106); the inclination (A) is preferably between 3°–10°, and change preferably, of more preferably, of 5°;

(b) seeing that the two trimmed-edge scraps (104 and 106) are provided with at least one reinforcing element (86), which usually is a metallic steel cord, they act like continuous tapes that can be collected, so much so that it is convenient to guide them to a collecting elements, while also signaling their continuity. This guiding and signaling of their continuity takes place through pulley sheaves which are provided with grooves (108, 110 and 112, 114), and through electro-magnetic proximity detectors (116 and 118).

The discs (88, 92 and 90, 94) that form the two shears (80 and 82), are shaped so as to give to the trimmed edge of rubberized fabric sheet (84) a form that is complementary for favoring the butt-end joining of the pairs of fabric lengths obtaim by cross-cutting from the sheet. In fact, the disc 88 has a very low frusto-conical form, provided with a greater base, a lesser base, and a conical surface (120) acting as a cutting wedge.

The disc 90 is similarly formed as a very low truncated cone, also provided with a greater base, a lesser base, and a conical surface (122). In addition the two rear discs (92 and 94) are provided with the respective conical surfaces (124 and 126) that also act as cutting wedges.

As illustrated in FIG. 4, in particular, the front discs (88 and 90) are disposed so as to have their greater surfaces turned toward the mid-plane of the sheet; whereas the rear discs (92 and 94) have their greater surfaces turned towards the edges of the sheet. Moreover, the front discs (88 and 90) are placed outside the rear discs (92 and 94), so that upon these two outer edges of sheet (84) there act the cutting wedges of the respective conical surfaces (120 and 126) oriented parallel to each other at the point where they cut the said sheet (84), producing cuts in the lateral, inclined and parallel edges that, in the instance of a butt-end joint, result as being in reciprocally complementary directions, thus favoring the joining.

Figure 5:
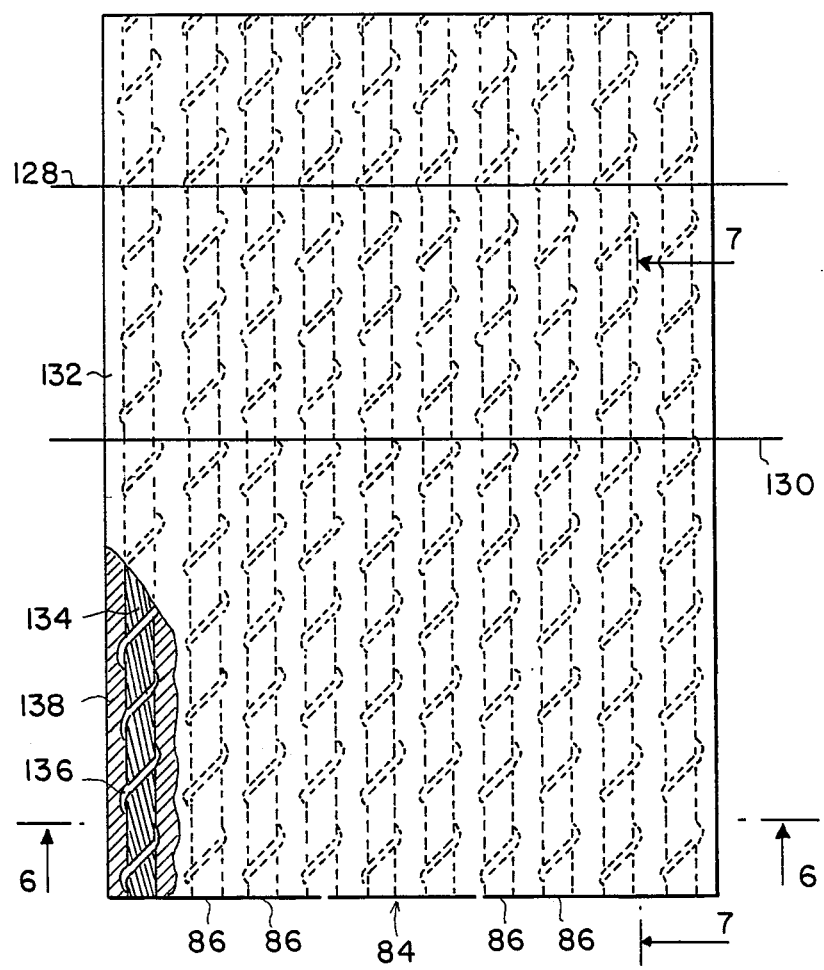
FIG. 5—shows a sheet of rubberized fabric, reinforced with longitudinal metallic cords, that is ready for being cut into tape elements with transversal reinforcements, to be used for forming continuous tapes.
Figure 6:
FIG. 6—shows a cross-section, taken along the line 6—6, of the rubberized fabric sheet shown in FIG. 5.
Figure 7:
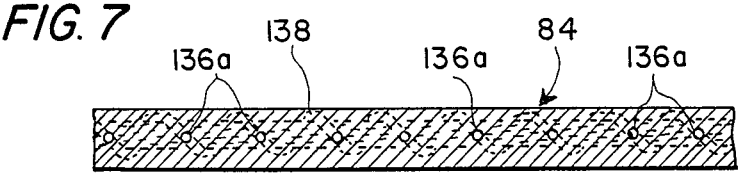
FIG. 7—shows a cross-section, taken along the line 7—7, of the rubberized fabric sheet shown in FIG. 5.

To obtain a more complete comprehension of the extent of the application for the present invention, FIGS. 5, 6 and 7 should be considered, where a sheet (84) of rubberized fabric containing the reinforcing elements (86) is illustrated. In the particular application, where the sheet (84) serves for preparing continuous tapes for producing plies for radial carcass tires, a rubberized fabric sheet having an endless length is trimmed by the device of the present invention, cut along a transversal cutting line such as, for example, the lines 128 and 130, for so obtaining the tape lengths (132) that are then butt-end joined to one another, through a device such as described in U.S. Pat. No. 369022 and U.S. Pat. No. 4,058,475, U.S. patent application No. 058231, so as to have a very long continuous tape, from which to prepare plies for the above-mentioned radial carcass tires.

In the particular sheet (84) of the rubberized fabric dealt with here, the reinforcing elements (86) are formed by a cord comprised by steel wires (134) that are twisted slightly, according to a rather long-pitch, bound by a finer wire (136), called a 'wrapper', which is more deformable and which is wound in the contrary sense and with a shorter pitch than for the wires (134), that prevents any loss in the twisting of the wires (134) which could consequently lead to the steel-flaking defect.

The trimming cuts realized by the device according to the invention are carried out in such a way that, when examining a trimmed edge of a sheet (84), there appears a rubber mass (138) from which protrude the outermost parts (136a) of wrapper (136) that is wound around the bunch of wires (134). The functioning of the device according to the invention is as follows.

The leading end of the rubberized fabric sheet (84) is inserted between the two shears (80 and 82) borne by the respective frames (76 and 78). By acting on the respective control wheels (36 and 38), the shears (80 and 82) become positioned in such a way that each is disposed along the edge of one of the reinforcing elements (86), which are present in the rubberized fabric sheet (84). The articulated parallelograms (64 and 66), through a self-acting operation, adjust the positions of the shears (80 and 82) along the reinforcing elements (86). Once these shears (80 and 82) are correctly positioned, the sheet (84) is then drawn, and the discs (88, 92 and 90, 94), that form the shears (80 and 82), are made to rotate by means of electric motors (96 and 98) for proceeding simultaneously with the trimming both edges.

The scrap 104 and 106 (see in particular, FIGS. 3 and 4), is removed from the sheet by means of the respective pulleys (108, 110 and 112, 114), and they are passed on to the respective proximity detectors (116 and 118) that attend to the correct removal of the scrap from the sheet (84).

Although hereabove, there has been described a preferred example for the realization of the present invention, it is understood that what is also intended as being included and as all considered to be protected by the present description, are all the possible alternative and/or equivalent variations, drawn from the inventive principle, that are available to anyone skilled in the art.

What is claimed is:

1. A device for cutting and trimming the edges of a rubberized fabric provided with longitudinal reinforcing elements, such as metallic cords, along one of said reinforcing elements, which comprises providing at least one pair of shears for each edge of said fabric, each pair of shears including opposing rotatable blades provided with sharp edges, said edges being disposed on opposite sides of said fabric in such a way so as to be reciprocally superimposed, each pair of shears being mounted on an oscillating frame, such as an articulated parallelogram, whereby said shears can move transversely on the rubberized fabric cutting said fabric precisely along one of said reinforcing elements.

2. The device of claim 1, wherein each shear consists of a rotatable blade having a sharp edge and a conical disc, disposed opposite each other in such a way that their edges superimpose or interfere reciprocally, along a tract that corresponds substantially with the thickness of said rubberized fabric to be cut, and can rotate in the contrary sense at substantially equal peripheral velocities.

3. The device of claim 1, wherein said opposed conical discs each have a greater side that is engaged so as to interfere with a corresponding side of the other disc, and also a lesser side opposite said greater side, so that said two greater sides correspond with inner sides of said shears and said lesser sides correspond with outer sides.

4. The device of claim 3, wherein said greater sides of the pair of conical shear-like discs that cut, or trim the edge of said rubberized fabric present a certain angle as contained between about 3° and 10° with respect to the direction of the reinforcing elements, or metallic cords embedded in said rubberized fabric.

5. The device of claim 4, wherein said angle is about 5°.

6. The device of claim 1, characterized by the fact that said shears have rotatable blades precisely disposed with respect to a rubberized fabric edge to be trimmed, according to a positioning device consisting of a screw shaft (40 or 42), engaged with a cylindrical sleeve (52 or 54) whose threaded inner cavity bears a frame (76 or 78), for supporting an actioning motor (96 or 98) as well as the conical discs of said shears (80 or 82).

7. The device of claim 6, characterized by the fact that, for the purpose of spontaneously compensating any positioning irregularities respecting said shears (80 or 82), with respect to said reinforcing elements (86) present in the rubberized fabric, said cylindrical sleeve (52 or 54), engaged with said screw shaft (40 or 42), drags two parallel sides of an articulated parallelogram (64 or 62) having, on one side, a sliding sleeve (60 or 62) inserted upon a fixed guide (22) that is parallel to said screw shaft (40 or 42) and with, on the other side, said frame (76 or 78) supporting the motor (96 or 98) and the shears (80 or 82), in such a way that the shears (80 or 82) can be moved on the rubberized fabric (84), for finding the best position for the cutting point.

8. The device of claim 6, characterized by the fact that said frame (76 or 78), bearing the motor and the conical discs of the shears is moreover, provided with the guide means (108, 110 or 112, 114) and with detectors (116 or 118) for revealing the presence of a trimmed scrap from the edge, or, a burr (104 or 106) that has been detached from said rubberized fabric (84).

9. The device of claim 1, wherein said device consists of two pairs of conical shear-like discs (80 and 82), each one being disposed at one edge of the rubberized fabric (84), with their having the above-mentioned characteristics and the accessories.

10. A rubberized fabric, cut with a device as described in claim 1, wherein said fabric (84) is cut, along one of its reinforcing elements (86) constituted by a metallic stranded cord (134) twisted with a long-pitch, encompassed by a wrapper (136), that is wound, in the contrary sense to the twisted strands, and also with a decidedly shorter pitch, said cut, made along the reinforcing element (86), is effectuated in such a manner that only the outermost tops (136a) of the wrapper, protrude from the rubber mass of the said fabric (84).

* * * * *